United States Patent [19]

Neefe

[11] 4,166,088

[45] Aug. 28, 1979

[54] METHOD OF MAKING HIGH QUALITY PLASTIC LENSES

[76] Inventor: Charles W. Neefe, P.O. Box 429, Big Spring, Tex. 79720

[21] Appl. No.: 877,081

[22] Filed: Feb. 13, 1978

Related U.S. Application Data

[63] Continuation-in-part of Ser. No. 793,388, May 25, 1977, abandoned.

[51] Int. Cl.² ............................................. B29D 11/00
[52] U.S. Cl. .................................... 264/1; 250/492 R; 264/22; 425/808
[58] Field of Search ...................... 264/1, 22; 425/808; 250/504, 492 R

[56] References Cited

U.S. PATENT DOCUMENTS

| 2,525,664 | 10/1950 | Godsby et al. | 264/22 |
| 3,056,166 | 10/1962 | Weinberg | 264/1 |
| 3,761,208 | 9/1973 | Boudet | 264/1 |
| 4,011,456 | 3/1977 | Bredewater et al. | 250/492 R |
| 4,022,855 | 5/1977 | Hamblen | 264/1 |
| 4,039,827 | 8/1977 | Zdrok et al. | 250/429 R |
| 4,073,577 | 2/1978 | Höfer | 264/22 |
| 4,113,224 | 9/1978 | Clark et al. | 264/1 |

FOREIGN PATENT DOCUMENTS

618787 of 1949 United Kingdom ............... 264/1

*Primary Examiner*—James B. Lowe

[57] ABSTRACT

A method of making plastic lenses by casting a liquid monomer and a photosensitive catalyst between two transparent optical molds. One of the transparent molds having a convex lens on the outer surface to focus ultraviolet light toward the center of the monomer activating the photosensitive catalyst and initiating polymerization in the center of the plastic lens material. Polymerizing the monomer to form a solid lens having optical surfaces formed by the transparent molds.

1 Claim, 1 Drawing Figure

METHOD OF MAKING HIGH QUALITY PLASTIC LENSES

Continuation-in-part application Ser. No. 793,388, filed, May 25, 1977, now abandoned entitled; A METHOD OF MAKING HIGH QUALITY PLASTIC LENSES.

BACKGROUND OF THE INVENTION

The use of plastic materials for making optical lenses has increased rapidly for the past ten years. This is due to the availability of better plastic materials and the physical advantages of the plastic resins for specific application such as ophthalmic lenses. The technology for the production of high quality plastic lenses has not kept pace with the material supply industry. It is important to advance both areas if the full potential is to be realized.

Plastic lenses offer many advantages over glass lenses. They are much lighter in weight and resist breakage. The cost of making high quality lenses has been high, due to the problems caused by the shrinkage of the monomer when polymerized.

The current lens molds are fabricated from glass, each mold is individually ground and polished to the required specifications. To achieve accurate reproduction of the bifocal and lenticular molds is most difficult and expensive. This new process makes possible exact reproductions and has many other distinct advantages which will become apparent from the following disclosure.

SUMMARY

An object is to provide a process for making inexpensive molds which may be made to identical specifications.

Another object is to provide a process where ultraviolet light may be used to control the area and rate of polymerization at room temperature. Thermosetting and crosslinked hard materials may be used to produce lenses which are very dimensionally stable and could not be made by injection or compression molding. This process is also suitable for the production of soft contact lenses which cannot be made by compression or injection molding techniques.

THE LENSES ARE MADE AS FOLLOWS

Figure 1:
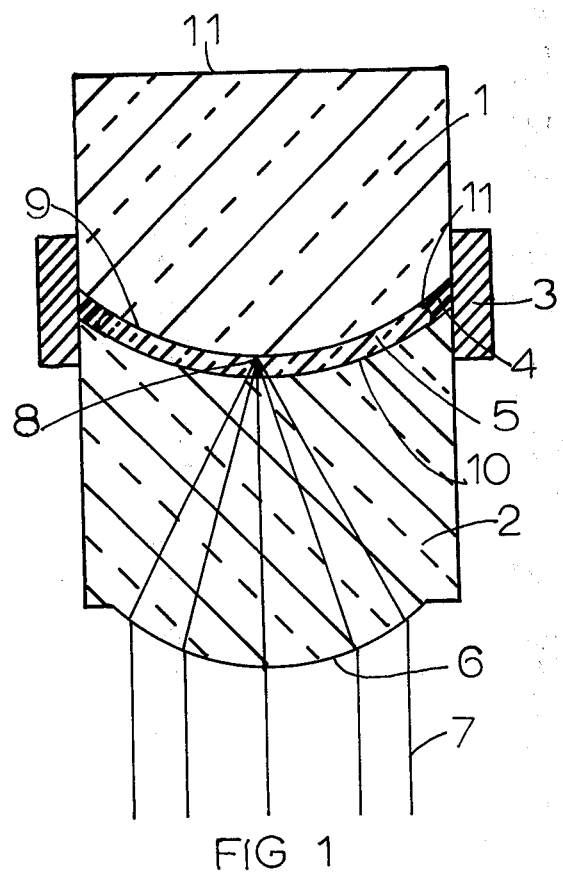
FIG. 1 shows the assembled optical molds containing the lens material and the edge contour mold ring.

A convex optical mold 1, FIG. 1 and a concave mold 2, FIG. 1 are made from an ultraviolet transparent resinous material such as polyvinyl chloride, methylpentene, acrylic or nylon polymers which is compression or injection molded using a steel master mold. A convex lens surface 6, FIG. 1 having a focal length equal to the mold thickness is provided on one of the molds. A flexible edge contour mold 4, FIG. 1 secured to the rigid support ring 3, FIG. 1, and a selected edge contour provided on the inner edge 11, FIG. 1. The space between the mold surfaces 9 and 10, FIG. 1 is filled with a liquid lens monomer or mixture of monomers 5, FIG. 1 such as methylmethacrylate, styrene, polyesters, silicone or hydroxyethyl methacrylate. A photosensitive catalyst such as Benzoin, Azobismethylpropionitrile, Benzophenone or Triphenylphosphine is added to the monomer in amount ranging from 0.01 percent by weight to 0.7 percent by weight. Ultraviolet light 7, FIG. 1 is directed from a distance source toward the convex lens surface 6, FIG. 1 and focused at point 8, FIG. 1 at the center of the lens. Given sufficient time and ultraviolet light, 20 minutes, using a Norelco 300 watt sunlamp at 5 feet from the lens, polymerization will begin at the center of the lens 8, FIG. 1. After polymerization begins at the center an aluminum reflector may now be placed at the rear surface 11, FIG. 1 to effect polymerization in the remainder of the lens by reflecting ultraviolet light back into the monomer. Polymerization and shrinkage will start at the center and proceed outward toward the edge. The liquid monomers present at the edge prevents air from entering the mold and causing bubbles and lens separation from the mold to occur. When the polymerization reaches the edge, the flexible edge mold 4, FIG. 1 will move inward due to the negative pressure created within the mold by the shrinkage of the monomer during polymerization.

The use of ultraviolet light and photosensitive catalysts enables polymerization to proceed at room temperature, no external heat source is required. The polymerization may be stopped or slowed by removing the ultraviolet light. The lower temperature also produces less stress within the lens. Starting the polymerization at the center of the lens at room temperature reduces the number of rejects caused by bubbling and mold separation.

After the lens is processed to the required specification, the lens is removed by sharply flexing the mold 1, FIG. 1 separating the finished optical lens 5, FIG. 1 from the molds 1 and 2, FIG. 1.

Various modifications can be made without departing from the spirit of this invention or the scope of the appended claims. The constants set forth in the disclosure are given as examples and are in no way final or binding. In view of the above, it will be seen that the several objects of the invention are achieved and other advantages are obtained. As many changes could be made in the above construction and methods without departing from the scope of the invention, it is intended that all matter contained in the above description shall be interpreted as illustrative and not in a limiting sense.

That which is claimed is:

1. A method of controlling the polymerization of cast optical lenses at room temperature by the steps of providing two ultraviolet transparent optical molds made by compression or injection molding a selected resinous material, one of the molds having a convex refracting surface opposing the optical mold surface having a focal length equal to the mold thickness, the second mold having a flat surface opposing the optical mold surface, placing the optical surfaces of said mold within a rigid positioning ring such that their respective molding surfaces form a molding cavity, separating the edges of said optical surfaces with a circular flexible edge mold which extends between the optical mold surfaces to form the part of the molding cavity which will form the edge of the optical lenses and which is attached to said rigid positioning ring, filling the space between the optical mold surfaces with a selected liquid lens monomer and a selected photosensitive catalyst, directing ultraviolet light from a distinct source toward the convex refracting surface on the one mold to focus the ultraviolet light at the center of the body of liquid lens monomer to activate the photosensitive catalyst, allowing sufficient time for polymerization to begin at the center of the body of liquid lens monomer, placing an ultraviolet reflector at the flat surface of the second mold to reflect ultraviolet light back into the body of liquid lens monomer to complete the polymerization and form a solid lens body.

* * * * *